United States Patent [19]
Burton

[11] 3,789,940
[45] Feb. 5, 1974

[54] SYNCHRONIZED STEERING CONTROL SYSTEM

[75] Inventor: Robert V. Burton, Minneapolis, Minn.

[73] Assignee: Honeywell Inc., Minneapolis, Minn.

[22] Filed: Feb. 7, 1972

[21] Appl. No.: 223,897

[52] U.S. Cl. .............................. 180/6.48, 137/81.5
[51] Int. Cl. ............................................. B62d 11/04
[58] Field of Search .......... 180/6.48, 6, 5; 137/81.5

[56] References Cited
UNITED STATES PATENTS

| 3,217,822 | 11/1965 | Ross | 180/6.48 |
|---|---|---|---|
| 3,563,327 | 2/1971 | Mier | 180/6.5 |
| 3,247,919 | 4/1966 | Moon | 180/6.48 |
| 3,276,259 | 10/1966 | Bowles | 137/81.5 X |
| 3,217,821 | 11/1965 | Dumas et al. | 180/6.48 |

Primary Examiner—David Schonberg
Assistant Examiner—John A. Pekar
Attorney, Agent, or Firm—Lamont B. Koontz; Trevor B. Joike

[57] ABSTRACT

A fluidic steering control system having at least two propelling means, one for each side of the vehicle, a separate variable speed transmission for driving each of the propelling means, a separate fluidic circuit for driving each of the transmission means, a common steering transducer for controlling the relative outputs of the amplifying means, and feedback means for providing a feedback dependent upon the relative speeds of the transmissions.

8 Claims, 3 Drawing Figures

3,789,940

SYNCHRONIZED STEERING CONTROL SYSTEM

BACKGROUND OF THE INVENTION

This invention relates to a fluidic control concept for a dual path hydrostatic drive system. The fluid may be hydraulic oil or air although hydraulic oil is preferrable. Such systems may be used on vehicles such as track layers and all terrain vehicles and, also, may be used to maneuver twin screw boats or any other vehicle having at least two independently driven propelling means.

Basically, the system comprises a steering transducer which imparts a differential output to two amplifying systems. One amplifying system controls the propelling means for one side of the vehicle and the other amplifying system controls the propelling means for the other side of the vehicle. If the speeds of the propelling means are not synchronized, a motor speed error signal is fed back to the amplifying means to make the appropriate corrective speed adjustment.

The use of the synchronizer feedback permits vehicle speed changes and straight line operation without introducing any vehicle yawing. This operation results in a safer handling performance of the vehicle.

For vehicle turning, a steer control transducer produces a differential output signal which commands a differential output from the two amplifying systems which causes a differential speed output from the right and left side propelling means of the vehicle. The synchronizer feedback stabilizes the amplifying differential output signal to produce a vehicle turning rate proportional to the steer command and vehicle forward speed. Again, by using a synchronizer feedback signal, the turning rate is uniform and introduces no uncontrolled yaw into the operation of the vehicle.

The system may be fluidic or electronic although the preferred embodiment has been shown as a fluidic system. Further features and advantages will be apparent to those skilled in the art upon further study of this specification and its drawings, in which.

As shown in the preferred embodiment herein disclosed, the steering control system is a fluidic steering control circuit. However, it should be obvious to one skilled in the art that the electrical counterparts could be substituted for the fluidic parts and an electrical system could result for providing the synchronized steering of the vehicle.

Figure 1:
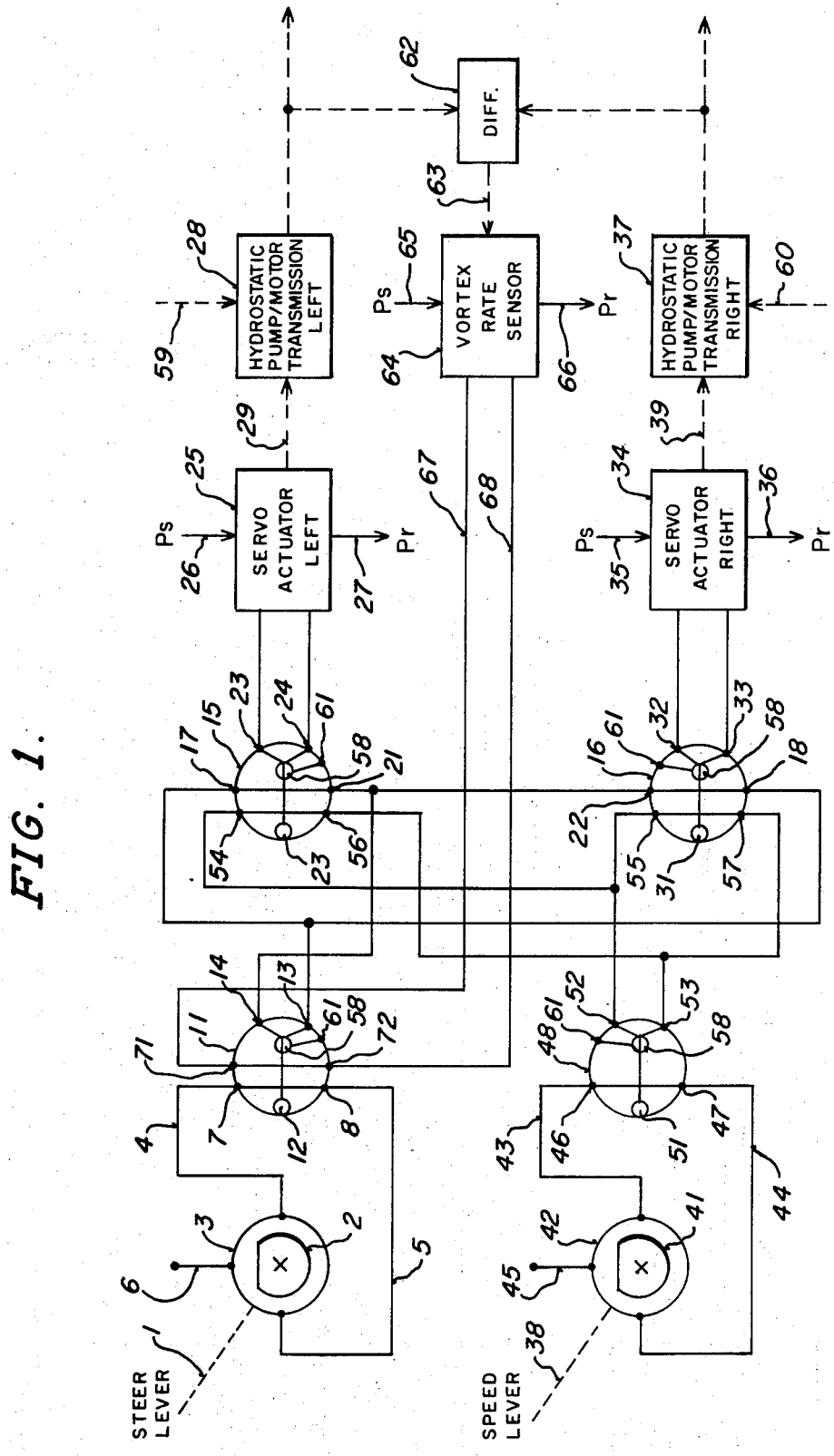
FIG. 1 shows the overall steering control system for use on a vehicle.

In FIG. 1, operation of steering lever 1 results in rotation of the flow divider 2 of steering command transducer 3 which, in turn, results in a differential output pressure in fluid lines 4 and 5. Transducer 3, as well as transducers 42 and 93, are more completely shown in copending application Serial No. 222,416 filed on Feb. 7, 1972 and assigned to the same assignee. Fluid is supplied to transducer 3 by way of input line 6 which derives its source of fluid from the master pump (not shown) which supplies fluid to all of the fluidic devices. The differential fluid flow established in lines 4 and 5 is fed through control ports 7 and 8 of fluid amplifier 11. The fluid power jet which is established in amplifier 11 by the power supply connected to the supply port 12 of amplifier 11 is deflected by the differential pressure established at ports 7 and 8. This deflection in the power jet results in a differential pressure in the output ports 13 and 14 which output lines are fed through corresponding control ports of fluid summing amplifiers 15 and 16.

The output port 13 of amplifier 11 is connected to control port 17 of amplifier 15 and to control port 18 of amplifier 16. Likewise, output port 14 of amplifier 11 is connected to control port 21 of amplifier 15 and to control port 22 of amplifier 16. It is noted that the output passages from amplifier 11 are connected in a reverse manner to amplifiers 15 and 16. Therefore, upon a differential pressure being established in the output ports 13 and 14 of amplifier 11, amplifiers 15 and 16 will be operated in an opposite manner. For instance, operation of fluid amplifier 15 will result in an increase in speed in the left side of the vehicle whereas operation of amplifier 16 will result in a decrease in the speed of the right side of the vehicle to thus affect steering to the right.

The amplifier 15 receives fluid supply at its port 23 from the pump (not shown) and establishes a fluid jet through the amplifier. A differential pressure established at control ports 17 and 21 cause deflection of this power jet which results in a differential pressure at the outlet ports 23 and 24 which are connected to control the servoactuator 25. Servoactuator 25 has an input line 26 and a return line 27 and results in a mechanical output 29 to the hydrostatic transmission 28 for driving the left side of the vehicle. This mechanical output 29 is an angular position of the transmission pump swash plate. The transmission 28 has an engine drive input 59.

Amplifier 16 receives a fluid supply at its input port 31 which establishes a fluid jet therethrough which, upon deflection by a differential pressure at the control ports 18 and 22, results in a differential pressure at output ports 32 and 33 which are connected to the inputs of servoactuator 34. Servoactuator 34 receives fluid from supply line 35 and returns the fluid to the reservoir (not shown) via return line 36 and is mechanically linked by 39 to drive the hydrostatic transmission 37 which operates to drive the propelling means driving the right side of the vehicle. Transmission 37 has an engine drive input 60.

The speed lever 38 is provided to control the overall speed of the vehicle. Speed lever 38 operates flow divider 41 of transducer 42 for providing a differential pressure on output lines 43 and 44. Fluid is supplied to the transducer 42 from supply line 45. This differential pressure is fed to control ports 46 and 47 of fluid amplifier 48. Fluid pressure supplied to input port 51 of amplifier 48 establishes a fluid jet through that amplifier which, upon a differential pressure existing at control port 46 and 47, is deflected to provide an output pressure differential from output ports 52 and 53. Output port 52 is connected to control port 54 of amplifier 15 and to control port 55 of amplifier 16. Output port 53 is connected to control port 56 of amplifier 15 and to control port 57 of amplifier 16. It is noted that the connections of outlet ports 52 and 53 will operate both amplifiers 15 and 16 in the same sense to drive both hydrostatic transmissions in a direct acting manner, i.e., both transmissions will be increased or decreased in speed due to operation of the speed lever 38.

All fluid amplifiers are provided with an isolation chamber 58 and a return port 61.

The outputs from hydrostatic transmissions 28 and 37, besides driving their respected propelling means, drive respective inputs of differential gears 62. The output 63 of the differential gears represents a difference in the speeds between the outputs of hydrostatic transmissions 28 and 37. Since these outputs drive the propelling means, the difference in speed between these outputs is also the difference in speeds between the right and left side of the vehicle.

Mechanical output 63 from the differential gear 62 is applied to the input of the vortex rate sensor 64 having a fluid supply line 65 and a return line 66. Operation of shaft 63 results in a differential pressure on output line 67 and 68 from the vortex rate sensor which are, respectively, fed to input ports 71 and 72 of fluid amplifier 11.

The differential pressure on output lines 67 and 68 act as a feedback synchronizing signal which has a value dependent upon the difference in speed of the output from hydrostatic transmissions 28 and 37.

In operation, when steering transducer 3 is operated to provide differential pressure on output lines 4 and 5, this differential pressure is amplified by amplifiers 11 and 15 to provide a corresponding change in the speed of hydrostatic transmission 28. Likewise, this differential pressure in amplified by amplifiers 11 and 16 to correspondingly, in an opposite manner, control the speed of transmission 37. The difference in output speeds of the transmissions 28 and 37 will cause the vehicle to turn with the inside turning radius being on the side of the vehicle having the slower speed. This differential speed is processed by differential gear 62 and vortex rate sensor 64 to provide a differential feedback signal on lines 67 and 68 which are fed back to summing amplifier 11. This feedback therefore stabilizes and synchronizes the output speeds of transmissions 28 and 37.

The fluidic devices of the circuit of FIG. 1 may be replaced by their electrical counterparts to form an electronic steering control system. For instance, transducers 3 and 42 may be replaced by potentiometers, amplifiers 11, 15, 16, and 61 by electronic amplifiers, servoactuators 25 and 34 by electric solenoids, and vortex rate sensor 64 by an electric tachometer.

Figure 2:
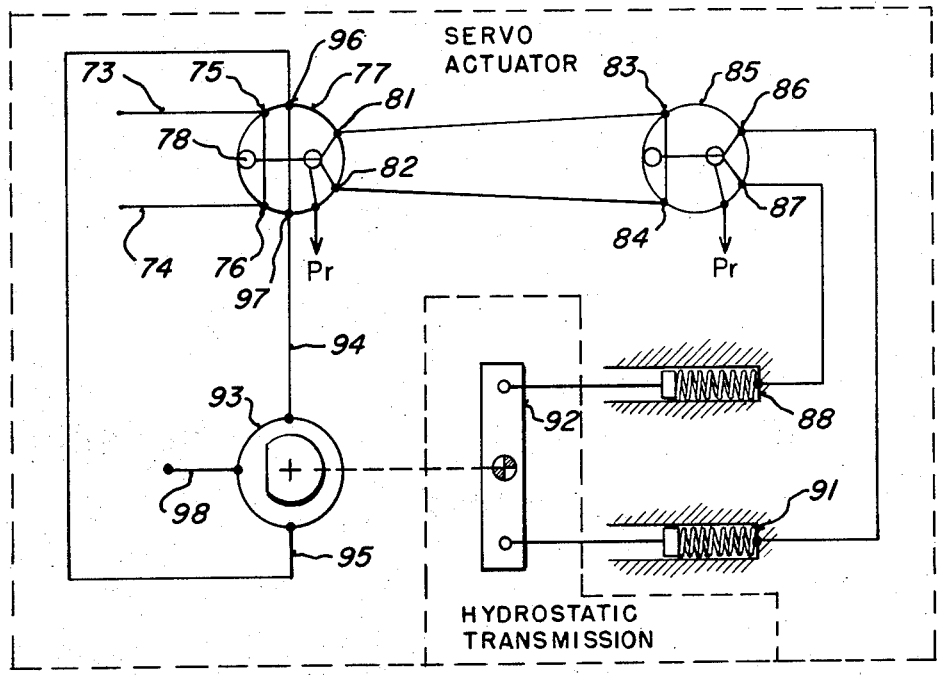
FIG. 2 shows in detail the servoactuator shown in block form in FIG. 1.

FIG. 2 more specifically shows the servoactuators 25 and 34 of FIG. 1. The outputs from amplifiers 15 or 16 are fed to the inputs 73 and 74 of the corresponding servoactuator. The input lines 73 and 74 are, respectively, connected to control ports 75 and 76 of servoactuator fluid amplifier 77. A fluid jet in the fluid amplifier is established by fluid pressure supplied to input port 78. This fluid jet will be deflected according to the differential pressure established in lines 73 and 74 and will result in a differential pressure on output ports 81 and 82. Output ports 81 and 82 are connected to the control ports 83 and 84 of a second fluid amplifier 85, the outputs of which are taken off by ports 86 and 87 and supplied to the hydrostatic pump swash plate control pistons 88 and 91. The differential pressure at pistons 88 and 91 result in the pistons moving in an opposite direction to affect turning of the swash plate 92 of the hydrostatic transmission. The altering of the position of the swash plate results in a change of speed of the output shaft of the hydrostatic transmission.

Operation of the swash plate 92 also results in a corresponding operation of feedback transducer 93 having output ports 94 and 95 connected to control ports 96 and 97 of fluid amplifier 77. Operation of the transducer 93 serves to provide a feedback signal to the summing amplifier 77 which position stabilizes the swash plate. The feedback transducer 93 receives its supply from input port 98.

Figure 3:
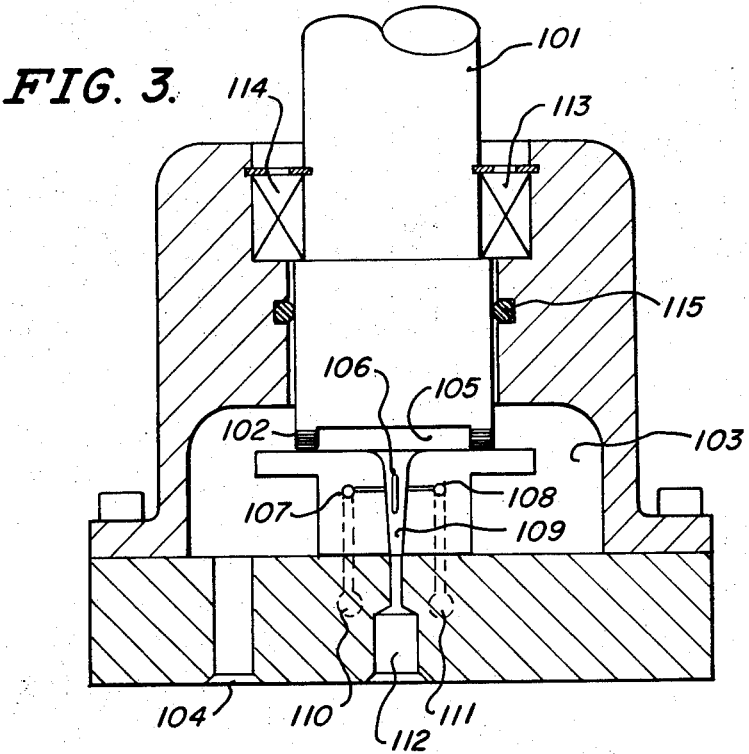
FIG. 3 shows the vortex rate sensor shown in block form of FIG. 1.

FIG. 3 shows in detail the vortex rate sensor which can be used for the sensor 64 shown in FIG. 1. Output 63 from differential gear 62 is connected to the input shaft 101 of the vortex rate sensor which has a coupling element of a porous material 102 extending into the fluid chamber 103. Fluid is supplied to the chamber 103 from supply port 104 and enters the vortex chamber 105 through the pores of coupling element 102. Provided that the input shaft 101 is not rotating, the fluid entering vortex chamber 104 will not have a vortical flow and, therefore, the pressure on each side of blade 106 will be equal which will result in the pressure at ports 107 and 108 being equal. Ports 107 and 108 are connected to the sink 109 to respond to any vortical flow in the tube 109. When the input shaft 101 is rotated, the porous coupling element 102 causes a vortical flow in the fluid in vortex chamber 105 which causes a vortical flow in the fluid down through the sink 109. This vortical flow establishes a differential pressure across the blade element 106 which is picked off by ports 107 and 108 and transmitted to outlet ports 110 and 111. The vortical fluid flow sink 109 is connected via return port 112 to the fluidic reservoir. The input shaft 101 is provided with bearings 113 and 114 and a sealing ring 115.

Outlet ports 110 and 111 are connected to the lines 67 and 68 shown in FIG. 1. Port 104 is connected to supply line 65 and return port 112 is connected to line 66.

Many changes, including widely different embodiments, can be made in the above construction of this invention by any one skilled in the art without departing from the scope of the invention. For example, electrical counterparts can be substituted for the fluidic devices shown here and to provide an all electrical system for controlling the steering of a vehicle. It is therefore intended that all matter contained in the above description and shown on the accompanying drawings should be interpreted in an illustrious sense and not in eliminating sense.

I claim:

1. A steering control system for a vehicle adapted to control right and left propelling means wherein the vehicle is turned by adjusting the relative speed between the right and left propelling means comprising:
right variable speed control means having an output adapted to drive right propelling means;
left variable speed control means having an output adapted to drive left propelling means;
steering means for providing a steering signal indicative of the desired direction for the vehicle, said steering means including feedback terminals;
connecting means connecting the steering means to at least one of said variable speed control means whereby said signal controls said one variable speed control means; and
difference sensing means for providing an output dependent upon the difference between the speeds of the right and left propelling means; and vortex rate sensor means for supplying to said terminals a signal dependent upon said output.

2. The steering control system of claim 1 wherein said system is a fluidic system.

3. The steering control system of claim 1 wherein said connecting means connects the steering means to said right and left variable speed control means in such a manner as to oppositely control the outputs thereof in response to said steering signal.

4. The steering control system of claim 3 wherein said steering means comprises a transducer for providing a fluidic steering signal.

5. The steering control system of claim 4 wherein each of said right and left variable speed control means comprises a separate fluidic servoactuator circuit.

6. The steering control system of claim 5 wherein said servoactuator circuits comprise fluid amplifier means.

7. The steering control system of claim 1 wherein said vortex rate sensor comprises a rotatable porous coupling element wherein said element forms a vortex chamber, means for supplying fluid to said chamber, means for acting as a sink for the fluid in said chamber, and means located in said sink for establishing a differential pressure output dependent upon the velocity of the vortical flow established in said chamber upon rotation of said coupling element.

8. The steering control system of claim 1 further comprising speed control means connected to said connecting means for controlling the right and left variable speed control means in the same sense to control the speed of the vehicle.

* * * * *